US009667550B2

(12) United States Patent
Gredler et al.

(10) Patent No.: US 9,667,550 B2
(45) Date of Patent: *May 30, 2017

(54) ADVERTISING TRAFFIC ENGINEERING INFORMATION WITH THE BORDER GATEWAY PROTOCOL FOR TRAFFIC ENGINEERED PATH COMPUTATION

(71) Applicant: Juniper Networks, Inc., Sunnyvale, CA (US)

(72) Inventors: Hannes Gredler, Pillberg (AT); Jan Medved, Pleasanton, CA (US); David Ward, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 14/697,415

(22) Filed: Apr. 27, 2015

(65) Prior Publication Data

US 2015/0244628 A1 Aug. 27, 2015

Related U.S. Application Data

(63) Continuation of application No. 13/411,292, filed on Mar. 2, 2012, now Pat. No. 9,019,865.

(Continued)

(51) Int. Cl.
*H04L 12/803* (2013.01)
*H04L 12/915* (2013.01)
(Continued)

(52) U.S. Cl.
CPC ............ *H04L 47/125* (2013.01); *H04L 45/04* (2013.01); *H04L 45/121* (2013.01);
(Continued)

(58) Field of Classification Search
CPC ....... H04L 12/56; H04L 45/028; H04L 12/46; H04L 12/28; H04L 41/082; H04L 41/308;
(Continued)

(56) References Cited

U.S. PATENT DOCUMENTS 7,599,349 B2 10/2009 Vasseur et al.
7,716,662 B2 5/2010 Seiden
(Continued)

FOREIGN PATENT DOCUMENTS

| CN | 101651703 A | 2/2010 |
| EP | 2461547 A1 | 6/2012 |
| WO | 2011054913 A1 | 5/2011 |

OTHER PUBLICATIONS

Alimi et al., "ALTO Protocol," draft-ielf-alto-protocol-03.txt, ALTO WG Internet-Draft, Mar. 8, 2010, 53 pp.
(Continued)

*Primary Examiner* — Ian N Moore
*Assistant Examiner* — Mewale Ambaye
(74) *Attorney, Agent, or Firm* — Shumaker & Sieffert, P.A.

(57) ABSTRACT

In general, techniques are described for distributing traffic engineering (TE) link information across network routing protocol domain boundaries using a routing protocol. In one example, a network device logically located within a first routing protocol domain includes a routing protocol module executing on a control unit to execute an exterior gateway routing protocol. The routing protocol module of the network device receives an exterior gateway routing protocol advertisement from a router logically located within a second routing protocol domain and decodes traffic engineering information for a traffic engineering link from the exterior gateway routing protocol advertisement. A path computation module of the network device computes a traffic engineered (Continued)

path by selecting the traffic engineering link for inclusion in the traffic engineered path based on the traffic engineering information.

19 Claims, 9 Drawing Sheets

Related U.S. Application Data

(60) Provisional application No. 61/449,499, filed on Mar. 4, 2011.

(51) Int. Cl.
| | | |
|---|---|---|
| H04L 12/727 | (2013.01) | |
| H04L 12/721 | (2013.01) | |
| H04L 12/723 | (2013.01) | |
| H04L 12/913 | (2013.01) | |
| H04L 12/715 | (2013.01) | |
| H04L 12/725 | (2013.01) | |

(52) U.S. Cl.
CPC .......... *H04L 45/124* (2013.01); *H04L 45/302* (2013.01); *H04L 45/44* (2013.01); *H04L 45/50* (2013.01); *H04L 47/724* (2013.01); *H04L 47/785* (2013.01)

(58) Field of Classification Search
CPC ..... H04L 45/50; H04L 45/121; H04L 45/124; H04L 47/724; G06F 15/173
USPC ....................................................... 370/254
See application file for complete search history.

(56) References Cited

U.S. PATENT DOCUMENTS

| | | | |
|---|---|---|---|
| 7,978,708 | B2 | 7/2011 | Filsfils et al. |
| 8,179,801 | B2 | 5/2012 | Previdi et al. |
| 8,300,532 | B1 | 10/2012 | Venkatramani et al. |
| 8,472,205 | B2 | 6/2013 | Gondosch et al. |
| 8,606,847 | B2 | 12/2013 | Raghunath et al. |
| 8,688,775 | B2 | 4/2014 | Penno et al. |
| 8,700,801 | B2 | 4/2014 | Medved et al. |
| 9,019,865 | B2 | 4/2015 | Gredler et al. |
| 2002/0062310 | A1 | 5/2002 | Marmor et al. |
| 2002/0128768 | A1 | 9/2002 | Nakano et al. |
| 2003/0179742 | A1 | 9/2003 | Ogier et al. |
| 2005/0170845 | A1 | 8/2005 | Moran |
| 2006/0029033 | A1* | 2/2006 | Lee .......... H04L 45/00 370/351 |
| 2006/0039391 | A1* | 2/2006 | Vasseur .......... H04L 45/04 370/409 |
| 2006/0085829 | A1 | 4/2006 | Dhodapkar et al. |
| 2006/0193248 | A1 | 8/2006 | Filsfils et al. |
| 2006/0200579 | A1* | 9/2006 | Vasseur .......... H04L 45/04 709/238 |
| 2006/0291445 | A1 | 12/2006 | Martini et al. |
| 2006/0291446 | A1 | 12/2006 | Caldwell et al. |
| 2007/0064702 | A1 | 3/2007 | Bates et al. |
| 2007/0280102 | A1* | 12/2007 | Vasseur .......... H04J 3/14 370/225 |
| 2009/0016365 | A1 | 1/2009 | Sajassi et al. |
| 2009/0122718 | A1 | 5/2009 | Klessig et al. |
| 2009/0234715 | A1 | 9/2009 | Heiser, II et al. |
| 2010/0161755 | A1 | 6/2010 | Li et al. |
| 2010/0208741 | A1* | 8/2010 | Vasseur .......... H04L 45/50 370/400 |
| 2010/0278076 | A1 | 11/2010 | Reddy et al. |
| 2010/0293294 | A1 | 11/2010 | Hilt et al. |
| 2010/0309841 | A1* | 12/2010 | Conte .......... H04L 45/24 370/328 |
| 2011/0078230 | A1 | 3/2011 | Sepulveda |
| 2011/0134769 | A1 | 6/2011 | Lee et al. |
| 2011/0202651 | A1 | 8/2011 | Hilt et al. |
| 2011/0276718 | A1 | 11/2011 | Steiner et al. |
| 2011/0295983 | A1 | 12/2011 | Medved et al. |
| 2011/0296053 | A1 | 12/2011 | Medved et al. |
| 2012/0066368 | A1 | 3/2012 | Li et al. |
| 2012/0144066 | A1 | 6/2012 | Medved et al. |
| 2012/0317293 | A1 | 12/2012 | Gu et al. |
| 2014/0101254 | A1 | 4/2014 | Raghunath et al. |
| 2014/0215079 | A1 | 7/2014 | Penno et al. |
| 2014/0229581 | A1 | 8/2014 | Medved et al. |

OTHER PUBLICATIONS

Alimi et al., "ALTO Protocol," draft-ietf-alto-protocol-06.txt, ALTO WG Internet-Draft, Oct. 25, 2010, 66 pp.
Bates et al., "Multiprotocol Extensions for BGP-4," RFC 4760, Jan. 2007, 13 pp.
Chandra et al., "BGP Communities Attribute", Network Working Group, RFC 1997, Aug. 1996, 6 pp.
Gredler et al., "Advertising Traffic Engineering Information in BGP", draft-gredler-bgp-te-00, Inter-Domain Routing, Internet Draft, published Mar. 4, 2011, 18 pp.
Harrison et al., "IPv6 Traffic Engineering in IS-IS," RFC 6119, Feb. 2011, 11 pp.
Katz et al., "Traffic Engineering (TE) Extensions to OSPF Version 2," RFC 3630, Sep. 2003, 15 pp.
Kompella et al., "IS-IS Extensions in Support of Generalized Multi-Protocol Label Switching (GMPLS)," RFC 5307, Oct. 2008, 13 pp.
Kompella et al., "Routing Extensions in Support of Generalized Multi-Protocol Label Switching (GMPLS)," RFC 4202, Oct. 2005, 27 pp.
Li et al., "IS-IS Extensions for Traffic Engineering," RFC 5305, 18 pp.
Penno et al., "ALTO and Content Delivery Networks", draft-penno-alto-cdn-03, Network Working Group, Internet Draft, Mar. 14, 2011, 28 pp.
Penno et al., "ALTO and Content Delivery Networks," draft-penno-alto-cdn-00, Network Working Group, Internet Draft, Jun. 4, 2010, 19 pp.
Penno et al., "ALTO Protocol," draft-penno-alto-protocol-00.txt, ALTO WG, Internet-Draft, Mar. 4, 2009, 22 pp.
Sangli et al., "BGP Extended Communities Attribute," RFC 4360, Feb. 2006, 13 pp.
Seedorf et al., "Application-Layer Traffic Optimization (ALTO) Problem Statement," RFC 5693, Network Working Group, Oct. 2009, 15 pp.
Seedorf et al., "Traffic Localization for P2P-Applications: The ALTO Approach," IEEE P2P'09, Sep. 9-11, 2009, pp. 171-177.
Sheng et al., "Application Layer Traffic Optimization in the eMule System," 2010 Fifth International Conference on Internet and Web Applications and Services, May 9-15, 2010, pp. 217-222.
Ye et al., "A Scheme to Solve P2P ALTO Problem," 2010 Second International Workshop on Education Technology and Computer Science, Mar. 6-7, 2010, pp. 459-462.
Zimmermann, "OSI Reference Model—The ISO Model of Architecture for Open Systems Interconnection," IEEE Transactions on Communications, vol. 28, No. 4, Apr. 1980, pp. 425-432.
Rekhter et al., "A Border Gateway Protocol 4 (BGP-4)", Network Working Group, RFC 4271, Jan. 2006, 93 pp.
Vohra et al., "BGP Support for Four-octet AS Number Space," RFC 4893, May 2007, 11 pp.
Prosecution History from U.S. Pat. No. 9,019,865, dated Oct. 16, 2013 through Jan. 26, 2015, 127 pp.

* cited by examiner

ADVERTISING TRAFFIC ENGINEERING INFORMATION WITH THE BORDER GATEWAY PROTOCOL FOR TRAFFIC ENGINEERED PATH COMPUTATION

This application is a continuation of U.S. application Ser. No. 13/411,292, filed Mar. 2, 2012, which claims the benefit of U.S. Provisional Application No. 61/449,499, filed Mar. 4, 2011, the entire contents of each of which are incorporated by reference herein.

TECHNICAL FIELD

The invention relates to computer networks and, more specifically, to improving traffic engineering path computation.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

SUMMARY

In general, techniques are described for distributing traffic engineering (TE) link information across network routing protocol domain boundaries using a routing protocol. In some examples, a network device executes one or more interior gateway protocols (IGPs) that include TE extensions, such as Open Shortest Path First with TE extensions (OSPF-TE) or Intermediate System to Intermediate System with TE extensions (IS-IS-TE), to receive and store TE link information for a routing domain to a traffic engineering database (TED). Traffic engineering links described by TE link information stored to the TED may represent, for example, physical links connecting physical nodes or virtual paths between physical or virtual nodes of one or more network domains. Traffic engineering link information for each link may include the local and remote Internet Protocol (IP) addresses (or other node identifiers) of link endpoints, local and remote interface identifiers, one or more link metrics, link bandwidth, reservable bandwidth, per Class of Service reservation state, preemption characteristics and Shared Risk Link Group information.

The network device additionally executes Border Gateway Protocol (BGP), which is a path vector protocol, modified to encode link-state information in the form of TE link information for TE links described in the TED according to a new BGP Network Layer Reachability Information (NLRI) encoding format (referred to herein as "TED NLRI"). The BGP process of the network device may generate BGP messages that include TED NLRI for the TE links and issue the BGP messages over intra- or inter-domain links to replicate a representation of the network device TED to entities located within the routing domain or within other IGP areas or autonomous systems (ASes).

The described techniques may present one or more advantages. For example, receiving a replicated representation of a TED generated by a remote network device in a remote area and/or autonomous system may allow finer granularity path computation within the remote area and/or autonomous system for inter-area and/or inter-AS source routed unicast and multicast tunnels. Moreover, these techniques utilize BGP as a ubiquitous database replication mechanism, which allows replication of many different state information types across arbitrary distribution graphs and provides a well-defined, uniform, policy-controlled interface from the network to outside servers, e.g., an Application Layer Traffic Optimization server or a Path Computation Element (PCE), that require network topology in near real-time. In addition, overloading BGP with the new TED NLRI may permit operators to reuse not only BGP protocol algorithms but also operational experience and administrative processes, such as inter-provider peering agreements.

In one example, a method includes receiving, with a router logically located within a first routing protocol domain, traffic engineering information for a traffic engineering link. The method also includes encoding the traffic engineering information to an exterior gateway routing protocol advertisement. The method further includes sending the exterior gateway routing protocol advertisement from the router to a network device logically located within a second routing protocol domain.

In another example, a method includes receiving, with a network device logically located within a first routing protocol domain, an exterior gateway routing protocol advertisement from a router logically located within a second routing protocol domain. The method also includes decoding traffic engineering information for a traffic engineering link from the exterior gateway routing protocol advertisement. The method further includes computing, with the network device, a traffic engineered path by selecting the traffic engineering link for inclusion in the traffic engineered path based on the traffic engineering information.

In another example, a router logically located with a first routing protocol domain includes a control unit comprising a processor. A routing protocol module executes on the control unit to execute an exterior gateway routing protocol, wherein the routing protocol module encodes traffic engineering information for a traffic engineering link to an exterior gateway routing protocol advertisement, wherein the routing protocol module sends the exterior gateway routing protocol advertisement to a network device logically located within a second routing protocol domain.

In another example, a network device logically located within a first routing protocol domain includes a control unit comprising a processor and a traffic engineering database. A routing protocol module executes on the control unit to execute an exterior gateway routing protocol. The routing protocol module receives an exterior gateway routing protocol advertisement from a router logically located within a second routing protocol domain, decodes traffic engineering information for a traffic engineering link from the exterior gateway routing protocol advertisement, and installs the traffic engineering information to the traffic engineering database. A path computation module executes on the control unit to compute a traffic engineered path by selecting the traffic engineering link from the traffic engineering database for inclusion in the traffic engineered path based on the traffic engineering information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
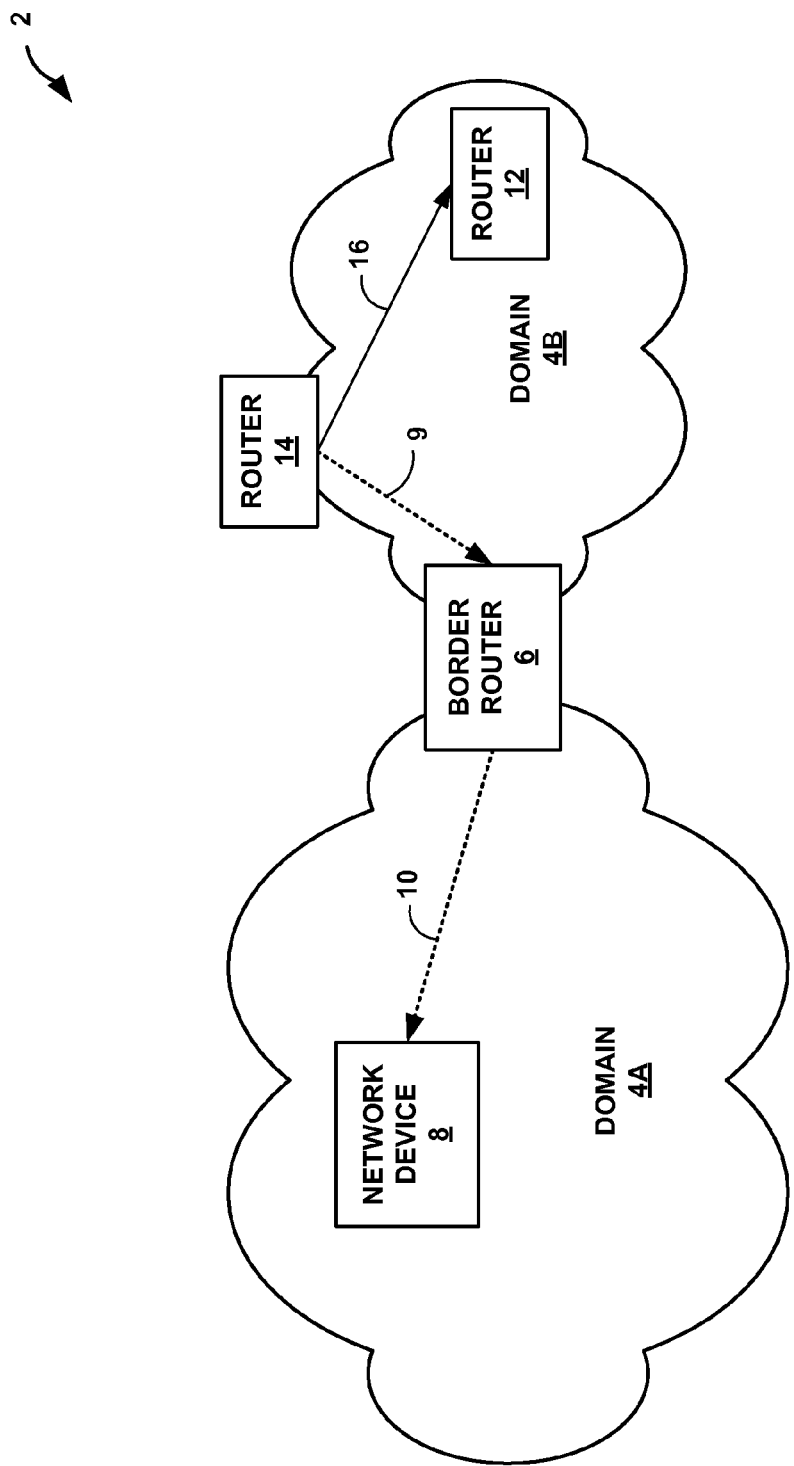
FIG. 1 is a block diagram illustrating an example network system that includes routers that distribute traffic engineering (TE) link information across network domain boundaries using a routing protocol in accordance with techniques described herein.

FIG. 1 is a block diagram illustrating an example network system that includes routers that distribute traffic engineering (TE) link information across routing protocol domain boundaries using a routing protocol in accordance with techniques described herein. Network system 2 includes routing protocol domains ("routing domains") 4A, 4B each connected to border router 6. Each of routing domains 4A, 4B may represent an Interior Gateway Protocol (IGP) area within a multi-area IGP network, an Autonomous System (AS), or another collection of network devices that exchange routing information with one another using an IGP. For example, network system 2 may represent a multi-area Open Shortest Path First (OSPF) network or a multi-area Intermediate System to Intermediate System (IS-IS) network having at least two routing areas, i.e., routing domains 4A, 4B, each including border router 6, which in the example of multi-area IGPs may represent an area border router (ABR). As another example, each of routing domains 4A, 4B may represent an AS. In such an example, border router 6 may represent an Autonomous System Border Router (ASBR) of routing domain 4A.

Routers of routing domains 4A, 4B execute an Internet Protocol (e.g., IPv4 or IPv6) to route packets from a source network address to one or more destination network addresses, and each of routing domains 4A, 4B may offer network packet delivery to a network (or subnet) of one or more endpoints identified by a network address prefix that encompasses the network address range defined by the network addresses of endpoints. In some instances, routers of routing domains 4A, 4B support traffic engineering to improve utilization of network resources. In general, traffic engineering refers to operations to move traffic flow away from the shortest path computed by an interior gateway protocol and/or border gateway protocol and toward a potentially less congested or otherwise more desirable (from an operational point of view) physical path across the network. For example, a network administrator, path computation element (PCE), or path computing router may establish, using Resource Reservation Protocol with Traffic Engineering extensions (RSVP-TE) or another label distribution protocol (e.g., the Label Distribution Protocol (LDP)), one or more label switched path (LSP) tunnels that connect various pairs of routers of routing domain 4A and/or routing domain 4B to route network traffic away from network failures, congestion, and bottlenecks or to promote certain characteristics for paths, such as fiber diversity, a lower bit error rate, a higher MTU, and son on. Path computation elements are described in U.S. patent application Ser. No. 13/324,861, entitled "PATH COMPUTATION ELEMENT COMMUNICATION PROTOCOL (PCEP) EXTENSIONS FOR STATEFUL LABEL SWITCHED PATH MANAGEMENT" and filed Dec. 13, 2011, the entire content of which is incorporated by reference herein.

Routing domain 4B includes routers 12, 14 connected by Traffic Engineering (TE) link 16 that transports IP packets over a communication link from router 14 to router 12. The term "communication link," as used herein, comprises any form of transport medium, wired or wireless, and can include intermediate nodes such as network devices. TE link 16 may represent a physical network link directly connecting respective interfaces of routers 12, 14 or a virtual link or virtual path composed of one or more physical network links intermediated by one or more intermediate routers or abstract nodes (not shown). For example, TE link 16 may represent an LSP or traffic engineered LSP (LSP-TE). While described with respect to a single unidirectional network link from router 14 to router 12, i.e., TE link 16, the techniques of this disclosure may be applied to distribute TE link information for multiple TE links connecting router 12, router 14, and border router 6 in various topologies.

Router 14 is configured with TE link 16 configuration information by an operator and/or network agent. TE link 16 configuration information includes TE link 16 attributes such as router endpoint and/or interface identifiers, LSP configuration information that reserves bandwidth of TE link 16 for use in a traffic engineered LSP, an administrative group (e.g., a color), a maximum bandwidth, a maximum reservable bandwidth, a link protection type, a TE default metric, an IGP link metric, per Class of Service (CoS) class reservation state, preemption characteristics, and/or a Shared Risk Link Group (SRLG) identifier. In addition, router 14 may compute additional attributes based on performance characteristics of TE link 16 and/or based on bandwidth reservations in view of the configuration information. Router 14 may, for instance, compute unreserved bandwidth based on a configured maximum reservable bandwidth and a sum of bandwidth reservations; determine jitter or latency; determine optical characteristics such as an optical path, bit error rate (BER), forward error correction counts; and so on.

Router 14 executes an IGP with traffic engineering extensions, such as OSPF-TE or IS-IS-TE, for routing domain 4B to advertise the existence and traffic engineering attributes of TE link 16 to border router 6. Router 14 sends TE link advertisement 9, which includes TE link information for TE link 16, to border router 6. TE link advertisement 9 may represent, for example, an OSPF-TE Link State Advertisement (LSA) or an IS-IS-TE Link State Protocol Data Unit (LSPDU). Border router 6 receives TE link advertisement 9 and stores the TE link information for TE link 16 to a traffic engineering database (TED). Additional routers of routing domain 4B, including router 12, may similarly advertise TE link information for one or more additional TE links of routing domain 4B to border router 6. In addition, border router 6 may store TE link information to the TED for TE links originated at border router 6, i.e., TE links for which border router 6 is an ingress router.

In accordance with techniques of this disclosure, border router 6 encodes TE link information for TE link 16 to exterior gateway routing protocol (EGP) advertisement 10 and sends EGP advertisement 10 toward routing domain 4A for receipt by network device 8. EGP advertisement 10 may represent a Border Gateway Protocol (BGP) UPDATE message issued in a BGP or Interior Border Gateway Protocol (IBGP) peering session between border router 6 and network device 8, for instance. In this way, border router 6 replicates at least a portion of the TED for routing domain 4B to devices of routing domain 4A.

Network device 8 of routing domain 4A may represent a router or another network device that computes inter-routing domain paths through network system 2. For example, network device 8 may represent an Application Layer Traffic Optimization (ALTO) server or a Path Computation Element (PCE) that peers with an exterior gateway routing protocol (EGP) speaker to receive TE link information, including TE link information in EGP advertisement 10. In some instances, additional routers, such as an ASBR and/or router reflector of routing domain 4A, may receive EGP advertisement 10 and forward a representation of EGP advertisement 10 toward network device 8. Application Layer Traffic Optimization is described in U.S. patent application Ser. No. 13/110,987, entitled "DYNAMICALLY GENERATING APPLICATION-LAYER TRAFFIC OPTIMIZATION PROTOCOL MAPS" and filed May 19, 2011, the entire content of which is incorporated by reference herein.

Receiving a replicated representation of a traffic engineering database for remote routing area 4B generated by a border router 6 may allow finer granularity path computation by network device 8 of paths for inter-routing domain source routed unicast and multicast tunnels that include devices logically located within routing domain 4B. The techniques may further utilize a single EGP as a ubiquitous database replication mechanism, which allows replication of many different state information types across arbitrary distribution graphs and provides a single well-defined, uniform, policy-controlled interface from border router 6 to network device 8. As a result, rather than peering with both BGP speakers and IGP speakers in multiple areas and/or ASes, network device 8 may peer with border router 6 or a route reflector over a single interface in just one of the area/ASes to obtain network topology data for a multi-area, multi-AS network. Because peering with IGP speakers over multiple areas conventionally requires establishing tunnels between IGP peers located in different IGP areas, the techniques may additionally reduce administrative tunneling overhead.

Figure 2A:
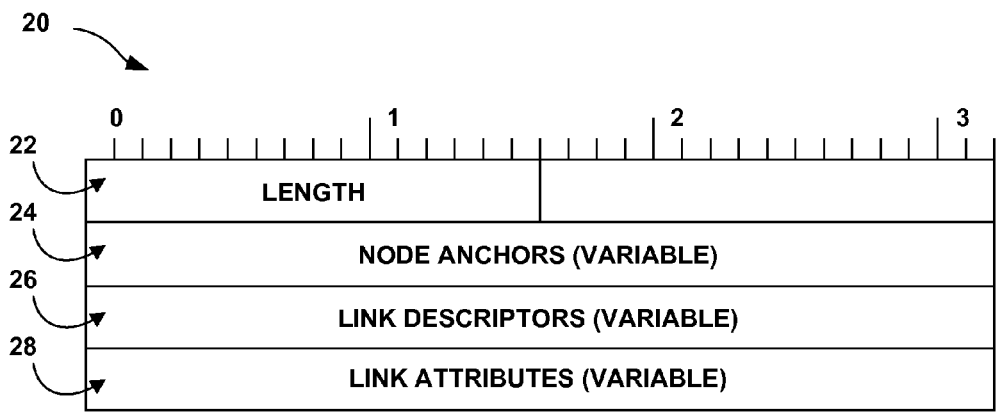
FIGS. 2A-2B present block diagrams illustrating example encodings of traffic engineering link information consistent with techniques described herein.

FIG. 2A is a block diagram illustrating an example encoding of traffic engineering link information consistent with techniques described herein. Traffic Engineering Database Network Layer Reachability Information (TED NLRI) 20 encodes TE information for a single TE link between two routers, such as TE link 16 of FIG. 1. TED NLRI 20 may be encapsulated within a multiprotocol border gateway protocol (MP-BGP) attribute for advertisement in an MP-BGP UPDATE message, for example. In some instances, routers may exchange TED NLRI 20 within a Multiprotocol Reachable NLRI (MP_REACH_NLRI) attribute, a Multiprotocol Unreachable NLRI (MP_UNREACH_NLRI) attribute, or another attribute. The Multiprotocol Reachable and Unreachable NLRI attributes are described further in Bates et al., "Multiprotocol Extensions for BGP-4," Request for Comments 4760, Internet Engineering Task Force Network Working Group, January 2007, which is incorporated by reference herein in its entirety. TED NLRI 20 may be identified within an attribute as a TED NLRI, i.e., as carrying an encoding of traffic engineering link information consistent with techniques described herein, by both an issuing and receiving router with a well-defined combination of Address Family Identifier (AFI) and Supplemental AFI (SAFI) values. Public routing and virtual private network (VPN) routing applications may use SAFI values of 1 and 128, respectively.

BGP (and MP-BGP) is a path vector protocol that, in contrast to link state routing protocols that advertise links connecting nodes, conventionally carries path vector routing information to advertise complete paths to reachable destinations. For example, with respect to FIG. 1, border router 6 may use BGP UPDATE messages to advertise itself as a next hop to a network prefix corresponding to domain 4B. In general, advertised paths specify autonomous system numbers or other domain identifiers that inform receiving routers of available paths through the broader network and allow such routers to select optimum paths in accordance with operator-defined policies. However, BGP UPDATE messages conventionally do not include link state information describing interior links of domains (e.g., routing domain 4B) or describing inter-area links connecting multiple domains (e.g., ASes or IGP areas). By incorporating TED NLRI 20 into BGP routing advertisements, border router 6 and other example routers that implement techniques described herein add link state information for interior links and/or inter-area links to BGP routing advertisements, which may enhance the routing domain granularity by exposing the interior traffic engineering topology of advertised networks (e.g., routing domain 4B).

TED NLRI 20 encodes traffic engineering link state information by defining three types of type-length-value (TLV) objects: node anchors 24, link descriptors 26, and link attributes 28. A length field 22 defines a cumulative length of all TLV objects included in TED NLRI 20. In this example, length field 22 is a two-octet value. Node anchors 24, link descriptors 26, and link attributes 28 may each include zero or more TLV objects according to defined types for the fields (e.g., types of node anchors 24, types of link descriptors 26, and types of link attributes 28).

TED NLRI 20 describes a single TE link anchored by a pair of network devices and/or aggregations of network devices respectively identified by router identifiers included in node anchors 24. That is, each node anchors 24 TLV object type identifies a network device or an aggregation or an aggregation of network devices with respect to a protocol. Example protocols include IP version 4 (IPv4), IP version 6 (IPv6), BGP (for distribution autonomous system numbers), and IS-IS. In addition, each of node anchors 24 TLV object type may further specify the router identifier as either local or remote for the described TE link. Local and remote router identifiers identify the respective corresponding network devices (or aggregations of network devices) as including ingress and egress interfaces for the TE link, respectively. Table 1 provides a description of examples of node anchors 24 TLV object types/lengths:

TABLE 1

| Type | Description | Length |
|---|---|---|
| 256 | Local Autonomous System | 4 |
| 257 | Local IPv4 Router-ID | 4 |
| 258 | Local IPv6 Router-ID | 16 |
| 259 | Local ISO Node-ID | 7 |
| 260 | Remote Autonomous System | 4 |
| 261 | Remote IPv4 Router-ID | 4 |
| 262 | Remote IPv6 Router-ID | 16 |
| 263 | Remote ISO Node-ID | 7 |

Router-ID examples of the example nodes anchors 24 TLV objects included in Table 1 may represent opaque values. For example, a Local IPv4 Router-ID (Type 257) may specify an IPv4 network address or another 32-bit router identifier. As another example, a Remote IPv6 Router-ID (Type 262) may specify an IPv4 network address or another 32-bit router identifier. As a still further example, a Local ISO Node-ID (Type 259) may specify a 56-bit ISO node identifier for IS-IS. In some instances, at least some of the values for nodes anchors 24 TLV objects in TED NLRI 20 are globally unique. In some instances, nodes anchors 24 TLV objects include both the Local and Remote Autonomous System number TLV objects (Types 256 and 260) to disambiguate router-IDs overloaded among autonomous systems and thereby provide global uniqueness for local and remote router-IDs when combined with respective local and remote Autonomous System numbers. Autonomous system numbers included within Local and Remote Autonomous System number TLV objects may be 4 octets wide, as described in Vohra et al., "BGP Support for Four-octet AS Number Space," Request for Comments 4893, Internet Engineering Task Force Network Working Group, May 2007, which is hereby incorporated by reference in its entirety. Two-octet autonomous system numbers may be expanded to four-octet autonomous system numbers by zeroing the two most significant octets.

TED NLRI 20 may include at least one pair of node anchors 24 TLV objects that specify a router identifier corresponding to the same protocol to identify the described TE link with respect to the protocol. For instance, continuing with the example Table 1, node anchors 24 TLV objects may include a Local IPv6 Router-ID (Type 258) TLV object and a Remote IPv6 Router-ID (Type 262) TLV to identify the node anchors of the described TE link with respect to IPv6. A network device may process incoming instances of TED NLRI 20 to match respective nodes anchors 24 TLV objects corresponding to the same protocols to develop a network topology that includes detailed TE link information for TE links in multiple routing domains.

Some instances of TED NLRI 20 may include multiple types of node anchors 24 TLV objects to describe a single node anchor. For example, a routing domain may include some routers that execute only a first routing protocol and some routers that concurrently execute the first routing protocol as well as a second routing protocol. In such cases, an instance of TED NLRI 20 may include multiple types of node anchors 24 TLV objects for the routers that concurrently execute a first and a second routing protocol. In one example instance of TED NLRI 20 to describe a TE link from an OSPF version 2 (OSPFv2) router and an OSPF-v2 and IS-IS enabled router, the NLRI encodes node anchors 24 TLV objects for the TE link including a Local IPv4 Router-ID (Type 257) TLV object corresponding to the OSPFv2-only router and a Remote IPv4 Router-ID (Type 257) TLV object, Remote IPv4 Router-ID (Type 257) TLV object, and Remote IPv4 Router-ID (Type 257) TLV object corresponding to the OSPFv2 and IS-IS enabled router. IS-IS enabled routers may support IPv6 traffic engineering extensions for IS-IS, which are described in Harrison et al., "IPv6 Traffic Engineering in IS-IS," Request for Comments 6119, Internet Engineering Task Force, February 2011, which is incorporated by reference herein in its entirety. Additional examples of node anchors 24 TLV objects in the context of IS-IS enabled routers are described with respect to FIG. 4.

Link descriptors 26 TLV objects of TED NLRI 20 uniquely identify a link between a pair of anchor routers identified by node anchors 24 TLV objects. Link descriptors TVL objects types may specify, for example, types for IPv4/IPv6 interface and neighbor network addresses as well as local and/or remote link identifiers. Table 2 provides brief descriptions of example link descriptors 26 TLV objects:

TABLE 2

| Type | Description |
|---|---|
| 4 | Link local/remote identifiers |
| 6 | IPv4 interface address |
| 8 | IPv4 neighbor address |
| 12 | IPv6 interface address |
| 13 | IPv6 neighbor address |

A link local/remote identifier TLV may contain four octets specifying Link Local Identifier followed by four octets specifying a Link Remote Identifier. If the Link Remote Identifier is unknown, it is set to 0. An IPv4 interface address TLV may contain a 4-octet IPv4 address for the local TE link interface. An IPv4 neighbor address TLV may contain a 4-octet IPv4 address for a neighboring router on the described TE link. Likewise, an IPv6 interface address may contain a 16-octet IPv6 address for the local TE link interface, and an IPv6 neighbor address TLV may contain a 16-octet IPv6 address for a neighboring router on the described TE link.

Link attributes 28 TLV objects of TED NLRI 20 specify attributes of the described TE link. Table 3 provides brief descriptions of example link descriptors 26 TLV objects:

TABLE 3

| Type | Description |
|---|---|
| 3 | Administrative group (color) |
| 9 | Maximum link bandwidth |
| 10 | Max. reservable link bandwidth |

TABLE 3-continued

| Type | Description |
| --- | --- |
| 11 | Unreserved bandwidth |
| 20 | Link protection type |
| 64512 | TE default metric |
| 64513 | IGP link metric |
| 64514 | Shared Risk Link Group |

An administrative group TLV may contain a 4-octet bit mask assigned by a network administrator. Each set bit of the bit mask may correspond to one administrative group assigned to the interface for the described TE link. A maximum link bandwidth TLV may contain a 4-octet floating point value specifying a maximum bandwidth, in bytes per second, that can be used on the described TE link. A maximum reservable bandwidth TLV may contain a 4-octet floating point value specifying a maximum bandwidth, in bytes per second, that may be reserved on the described TE link. An unreserved bandwidth TLV may contain a plurality of 4-octet floating point values that each specifies an amount of bandwidth reservable for a corresponding setup priority. A link protection type TLV value represents a protection capability that exists for the described TE link. Example link protection type TLV values are described in Kompella and Rekhter, "Routing Extensions in Support of Generalized Multi-Protocol Label Switching (GMPLS)," Request for Comments 4202, Internet Engineering Task Force Network Working Group, October 2005, section 2 of which being incorporated by reference herein.

A TE default metric TLV in TED NLRI 20 contains the TE default metric for the described TE link. The TE default metric may represent, for example, an IS-IS TE default metric that is a 24-bit value assigned by a network administrator to present a differently weighted topology to traffic engineering shortest-path first calculations; or an OSPF TE metric that is a 32-bit value assigned by a network administrator for traffic engineering purposes. In the case of an IS-IS TE default metric, the TE default metric value may be padded with one octet.

An IGP link metric TLV may contain the IGP (e.g., OSPF or IS-IS) metric for the described TE link. In some instances, TED NLRI 20 includes an IGP link metric only when the IGP link metric value differs from the TE default metric value. In some instances, an IGP link metric TLV includes a 3-octet value that may be zero-padded. A Shared Risk Link Group (SRLG) TLV may contain a data structure having a variable list of 4-octet SRLG values. A set of TE links may constitute a shared risk link group if they share a resource whose failure may affect all links in the set. SRLG values are described more fully in "Routing Extensions in Support of Generalized Multi-Protocol Label Switching (GMPLS)," incorporated above.

Figure 2B:
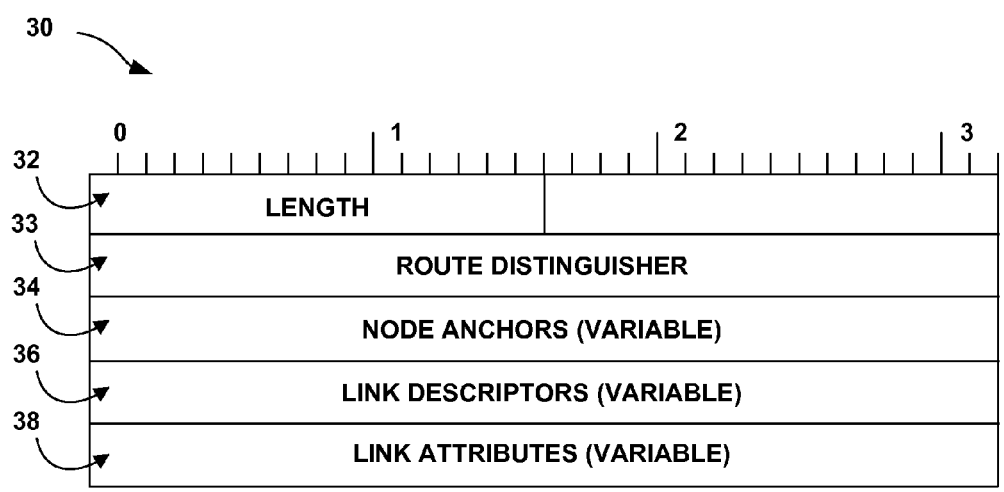

FIG. 2B is a block diagram illustrating an example encoding of traffic engineering link information consistent with techniques described herein. Traffic Engineering Database Network Layer Reachability Information (TED NLRI) 30 encodes TE information for a single TE link between two routers, such as TE link 16 of FIG. 1. TED NLRI 30 defines three types of type-length-value (TLV) objects, node anchors 34, link descriptors 36, and link attributes 38 that correspond to nodes anchors 24, link descriptors 26, and link attributes 38 of TED NLRI 20 of FIG. 2A. TED NLRI 30 includes an additional field, route distinguisher field 33 that specifies a route distinguisher identifying a VPN. TED NLRI 30 may therefore be included in an MP-BGP attribute having a SAFI of 128. Length field 33 defines a cumulative length of all TLV objects included in TED NLRI 30 and route distinguisher field 33.

Figure 3:
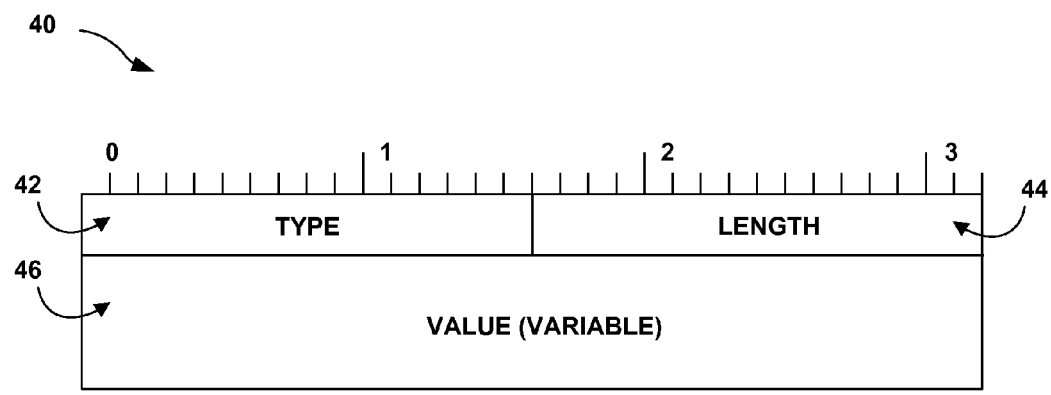
FIG. 3 is a block diagram illustrating an example of a type-length-value (TLV) object.

FIG. 3 is a block diagram illustrating an example of a type-length-value (TLV) object. TLV object 40 includes a 2-octet type field 42, a 2-octet length field 44, and a variable-length value field 46 whose length in octets is specified by the value of length field 44. In some instances, TLV object is padded to a 4-octet alignment. Each TLV object within nodes anchors 24, link descriptors 26, and link attributes 38 of TED NLRI 20 of FIG. 2A and within node anchors 34, link descriptors 36, and link attributes 38 of TED NLRI 30 of FIG. 2B may be encoded using a TLV object similar to TLV object 40.

Figure 4:
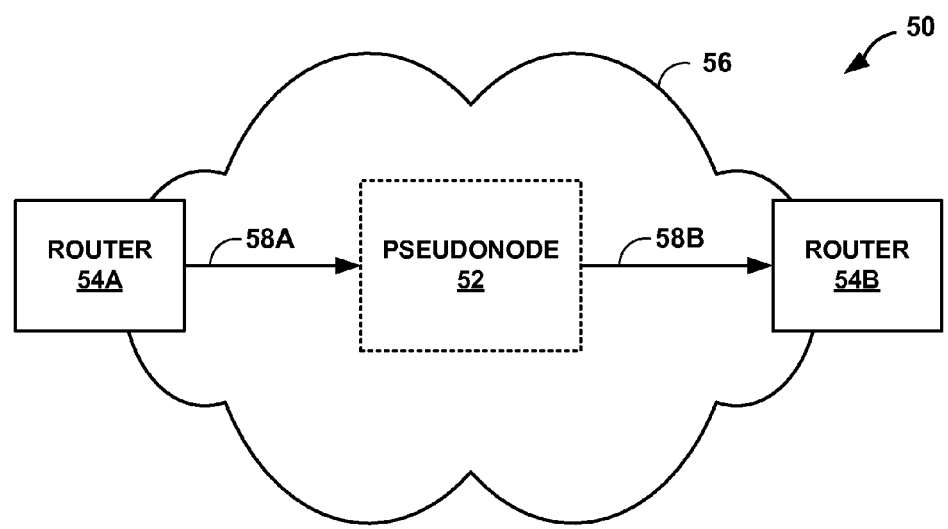
FIG. 4 is a block diagram illustrating example routers connected by a layer two (L2) network that use multiple TED NLRI to advertise, consistent with principles of this disclosure, TE links connecting the routers with a pseudonode representing the L2 network.

FIG. 4 is a block diagram illustrating example routers connected by a layer two (L2) network that use multiple TED NLRI to advertise, consistent with principles of this disclosure, TE links connecting the routers with a pseudonode representing the L2 network. Network system 50 in this example includes a broadcast local area network (LAN) 56 that connects routers 54A, 54B at layer two of the Open System Interconnection or TCP/IP model. LAN 56 may represent an Ethernet network. Physical routers 54A, 54B execute IS-IS and each have both an IPv4 router identifier (e.g., an IPv4 network address) and an ISO node identifier. Pseudonode 52 represents broadcast LAN 56 within the IS-IS routing domain and has an ISO node identifier but not an IPv4 router identifier.

Router 54A, which may in some instances represent a border router, advertises TE links 58A, 58B by encoding respective TE information for the TE link in multiple TED NLRI that includes multiple router identifiers for routers 54A, 54B. For example, A TED NLRI containing TE information for TE link 58A uses node anchor TLVs to encode a local IPv4 router identifier and local ISO node identifier for router 54A as well as a remote ISO node identifier for pseudonode 52. Similarly, a different TED NLRI containing TE information for TE link 58B includes node anchor TLVs to encode a local ISO node identifier for pseudonode 52 as well as a remote IPv4 router identifier and a remote ISO node identifier for router 54B. Router 54A may issue the TED NLRI encodings for TE links 58A, 58B using respective attributes in separate MP-BGP UPDATE messages in a BGP peering session with a BGP speaker. By supporting variable router identifier anchoring using multiple encoding types for node anchor TLVs in the manner described above, the techniques may allow applications to receive TED NLRI including multiple encoding types and construct network topology maps for traffic engineering purposes using router identifiers for drawn from multiple different protocol spaces by matching router identifiers of anchor nodes at anchor nodes that serve a subset of the multiple different protocol spaces. This may enlarge a scope and/or refine the granularity of the overall network topology map for TE path computation, for example.

Figure 5A:
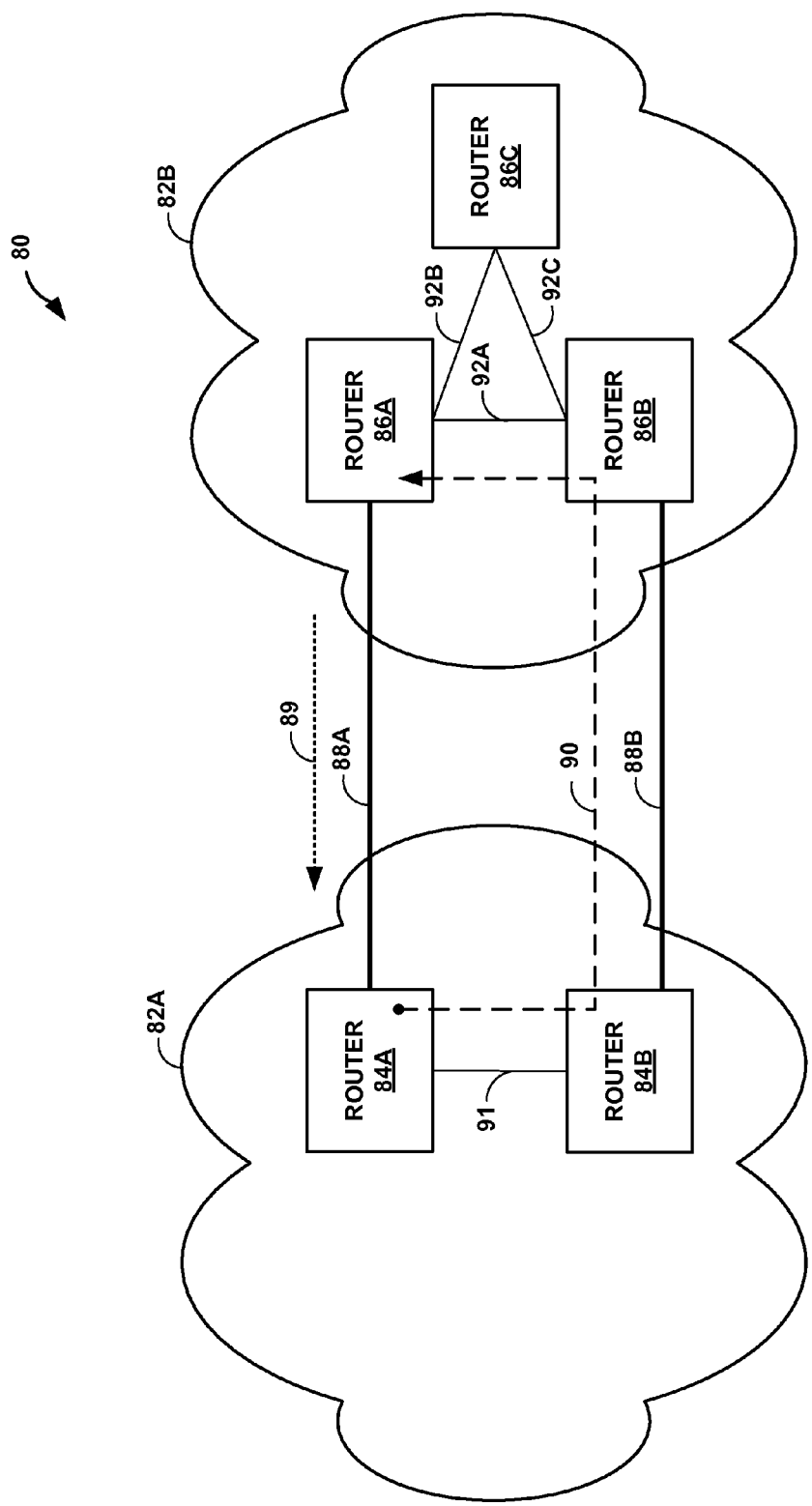
FIGS. 5A-5B present block diagrams illustrating a network system in which a remote autonomous system operator exposes a network topology by encoding and sending TED NLRI to a local autonomous system in accordance with principles of this disclosure.

FIG. 5A is a block diagram illustrating a network system in which a remote autonomous system operator exposes a detailed network topology by encoding and sending TED NLRI to a local autonomous system in accordance with principles of this disclosure. Network system 80 includes local autonomous system 82A ("local AS 82A") and remote autonomous system 82B ("remote AS 82B"), where the terms "remote" and "local" with respect to the autonomous systems refer to the network perspective of local AS 82A. Local AS 82A includes routers 84A, 84B coupled in an interior network topology by interior TE link 91, and remote AS 82B includes routers 86A-86C coupled in an interior network topology by interior TE links 92A-92C. Any one or more of routers 84A, 84B, 86A-86C may represent autonomous system border routers (ASBRs).

Inter-AS link 88A couples router 84A and router 86A, while inter-AS link 88B couples router 84B and router 86B. Each of inter-AS links 88A, 88B is a communication link and may alternatively referred to as a "peering link" to indicate local AS 82A and remote AS 82B peer with one another over the links to exchange routing information and network traffic. In this example, router 84A and router 86A establish a BGP-TE peering session with which to exchange routing information. Router 84A may be configured by a local AS 82A operator or software agent with TE information for inter-AS link 88A.

Router 86A exposes an interior topology of remote AS 82B by encoding traffic engineering information for interior TE links 92A-92C into respective TED NLRI and sending the TED NLRI to router 84A in BGP UPDATE message 89 specifying router 86A as a BGP NEXT_HOP. In other words, BGP UPDATE message 89 includes, for each of interior TE links 92A-92C, a TED NLRI that specifies router identifiers of node anchors, link descriptors, and link attributes of the interior link. Router 84A decodes the respective TED NLRI for interior TE links 92A-92C of remote AS 82B and stores the TE information to a TED for path computation.

Because of the importance of inter-AS link 88A as a network traffic conduit between local AS 82A and remote AS 82B, the local AS 82A operator may elect to protect inter-AS link 88A with a traffic engineered fast reroute (FRR) LSP from router 84A, operating as an FRR point of local repair, and router 86A, operating as an FRR merge point. Router 84A (or a path computation element) therefore computes a constrained shortest path from router 84A to router 86A using the router 84A TED topology that excludes inter-AS link 88A. In the illustrated example, router 84A computes a path that encompasses interior TE link 92A from router 86B to router 86A rather than interior TE links 92C, 92B from router 86B to router 86A. The detailed topology information exposed by remote AS 82B using techniques of this disclosure enables router 84A to compute this particular path through remote AS 82B based on any of the TE link attributes included in the TED NLRI for interior TE links 92A-92C, such as reservable bandwidth, latency, and so on.

Router 84A uses a TE LSP setup protocol, such as Resource Reservation Protocol with Traffic Engineering extensions (RSVP-TE), to establish TE LSP 90 along the computed path. As a result, any LSPs traversing paths from routers of local AS 82A to routers of remote AS 82B that include inter-AS link 88A may be rerouted along TE LSP 90 upon failure of inter-AS link 88A.

Figure 5B:
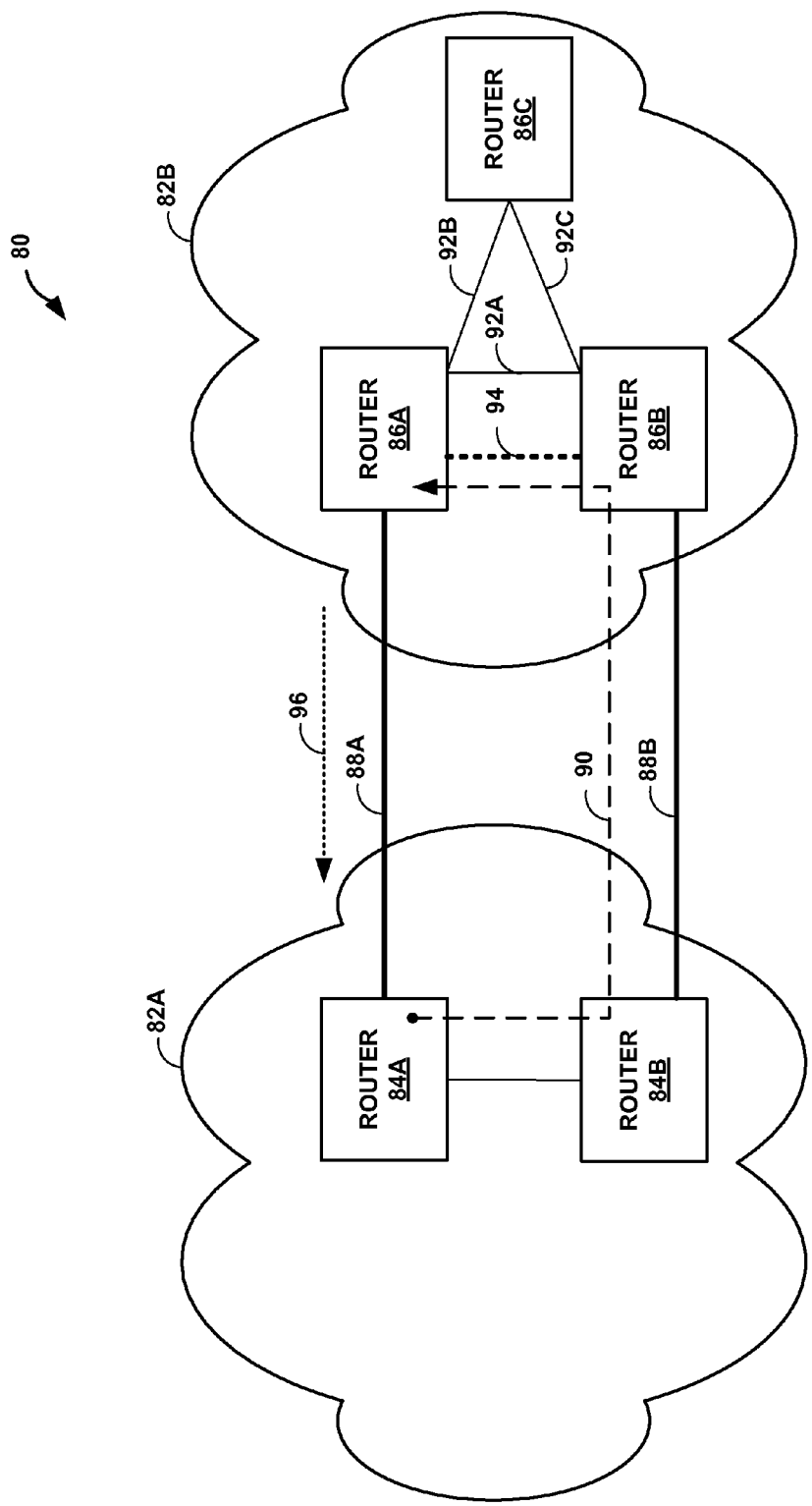

FIG. 5B is a block diagram illustrating a network system in which a remote autonomous system operator exposes an aggregated network topology by encoding and sending TED NLRI to a local autonomous system in accordance with principles of this disclosure. In this example, a remote AS 82B network operator configures router 86A with policies directing router 86A to aggregate interior TE links connecting router 86B to router 86A into a single aggregated TE link 94. Router 86A encodes aggregate TE link 94 to a TED NLRI for advertisement by BGP UPDATE message 96 to router 84A of local AS 82A. In other words, rather than advertising each of interior TE links 92A-92C and thereby exposing a detailed topology of remote AS 82B, router 86A advertises aggregate TE link 94 between router 86A and router 86B. Aggregate TE link 94 may require no modification to the example TED NLRI encodings described above. Instead, router 86A encodes TE information (which may be specified by an operator policy to facilitate the network operator's normative preferences with respect to remote AS 82B resources) for aggregate TE link 94 to indicate the TE link provides a path between router 86B and router 86A. Operator policies may specify varying degrees of aggregation. For example, in some instances, operator polices configured in router 86A may direct router 86A to advertise two aggregate TE links between router 86B and router 86A to reflect the two disparate paths over interior TE links 92A-92C between router 86B and router 86A while hiding the existence of router 86C.

Router 84A decodes the TED NLRI for aggregate TE link 94 advertised by remote AS 82B and stores the TE information to a TED for path computation. Router 84A (or a path computation element) computes a constrained shortest path from router 84A to router 86A using the router 84A TED topology that includes aggregate TE link 94 and excludes inter-AS link 88A. Router 84A then uses a TE LSP setup protocol, such as RSVP-TE, to establish TE LSP 90 along the computed path. Router 86B may determine, as part of TE LSP 90 setup and in accordance with remote AS 82B operator policies and/or dynamic resource utilization data for interior links 92A-92C, determine a path for TE LSP 90 from router 86B to router 86A. As a result, any LSPs traversing paths from routers of local AS 82A to routers of remote AS 82B that include inter-AS link 88A may be rerouted along TE LSP 90 upon failure of inter-AS link 88A.

Figure 6:
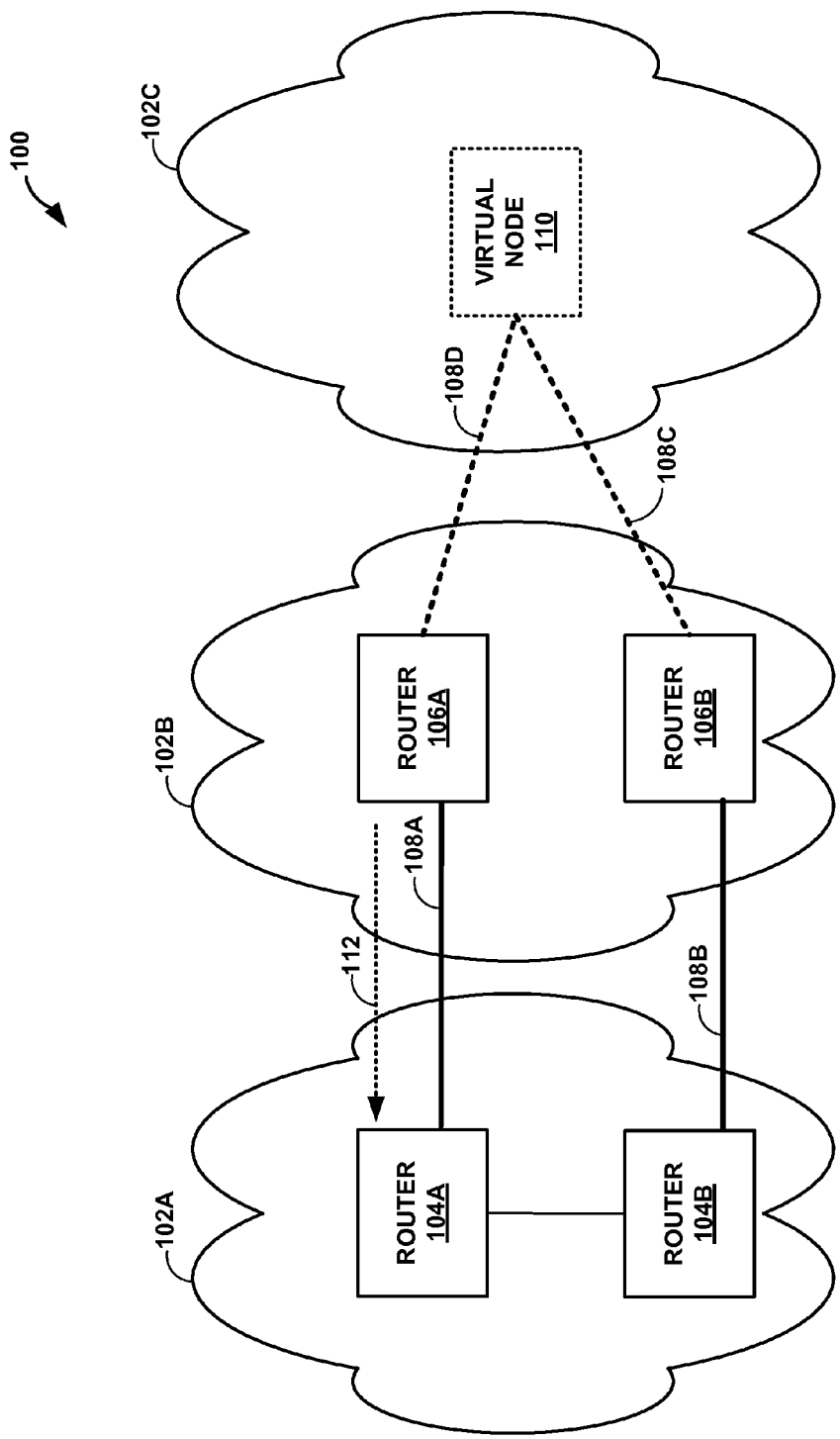
FIG. 6 is a block diagram illustrating an example network system in which a remote autonomous system operator exposes an aggregated network topology while suppressing detailed inter-AS TE link information by encoding and sending TED NLRI to a local autonomous system in accordance with principles of this disclosure.

FIG. 6 is a block diagram illustrating an example network system in which a remote autonomous system operator exposes an aggregated network topology while suppressing detailed inter-AS TE link information by encoding and sending TED NLRI to a local autonomous system in accordance with principles of this disclosure. Network system 100 includes local autonomous system 102A ("local AS 102A"), remote autonomous system 102B ("remote AS 102B"), and autonomous system 102C, where the terms "remote" and "local" with respect to the autonomous systems refer to the network perspective of local AS 102A. Local AS 102A includes routers 104A, 104B coupled in an interior network topology, and remote AS 102B includes routers 106A, 106B coupled in an interior network topology by interior TE links 92A-92C. Any one or more of routers 104A, 104B, 106A, 106B may represent autonomous system border routers (ASBRs).

Inter-AS link 108A couples router 104A and router 106A, while inter-AS link 108B couples router 104B and router 106B. Each of inter-AS links 108A, 108B is a communication link and may alternatively referred to as a "peering link" to indicate local AS 102A and remote AS 102B peer with one another over the links to exchange routing information and network traffic. In this example, router 104A and router 106A establish a BGP-TE peering session with which to exchange routing information. Router 104A may be configured by a local AS 102A operator or software agent with TE information for inter-AS link 108A.

In this example, a single network operator may operate ASes 102B, 102C that peer over one or more inter-AS links (not shown) connecting routers 106A, 106B of remote AS 102B with routers of autonomous system 102C (also not shown). Router 106A may be configured by the operator or a software agent with TE information for inter-AS links between router 106A and one or more routers of autonomous system 102C.

In accordance with policies prescribed by the network operator of remote AS 102B and autonomous system 102C, router 106A aggregates an internal topology of autonomous system 102C into a virtual node 110 and advertises TE link 108D between router 106A and virtual node 110. That is, router 106A models autonomous system 102C as a single node that connects to routers 106A, 106B of remote AS 102B with respective TE links 108C, 108D that represent aggregate paths. Router 106A encodes TE link 108D to a TED NLRI for advertisement by BGP UPDATE message 112 to router 104A of local AS 102A. The router identifier for node anchor TLVs of the TED NLRI represents virtual node 110 and may include an autonomous system identifier for autonomous system 102C. Router 106A in this way suppresses at least some of the TE information for the physical inter-AS links between remote AS 102B and autonomous system 102C while yet advertising the existence and TE information for TE paths connecting respective routers of remote AS 102B and autonomous system 102C. In some examples, router 106A advertises a set of consecutive links of a shortest path connecting router 106A and 106B through autonomous system 102C according to a policy, which may enable further traffic engineering by path computation devices using metrics of the set of consecutive links. Accordingly, router 106A may suppress (or "prune") all links of autonomous system 102C that are not members of the set of consecutive links of the shortest path.

Router 104A decodes the TED NLRI for TE link 108D advertised by remote AS 102B and stores the TE information to a TED for path computation. Router 104A (or a path computation element) may then compute constrained shortest paths to virtual node 110, for example, and use a TE LSP setup protocol to establish TE LSPs between routers of local AS 102A and/or remote AS 102B and virtual node 110.

Figure 7:
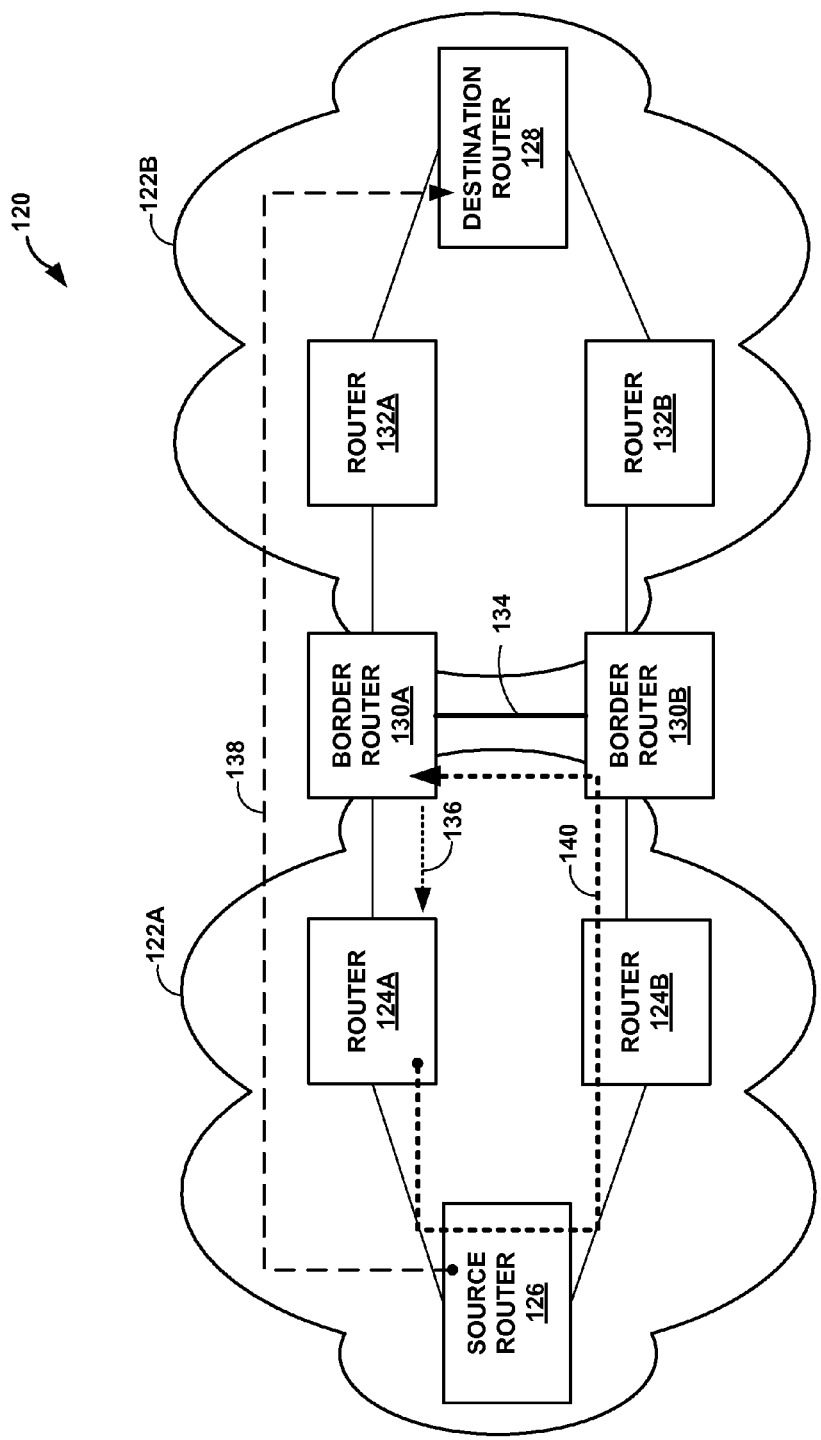
FIG. 7 is a block diagram illustrating an example system in which an area border router exposes an interior area topology by encoding interior TE links for an area to one or more TED NLRI and sending the TED NLRI to another area in accordance with principles of this disclosure.

FIG. 7 is a block diagram illustrating an example system in which a border router exposes an interior area topology by encoding interior TE links for an area (or autonomous system) to one or more TED NLRI and sending the TED NLRI to another area (or autonomous system) in accordance with principles of this disclosure. Network system 120 includes two IGP areas 122A-122B (collectively, "IGP areas 122") each connected to border routers 130A-130B (collectively referred to herein as "border routers 130"). Each of IGP areas 122 may represent a area of a multi-area IGP routing domain or an autonomous system, for example. Each of border routers 130 may represent an area border router that interfaces with multiple areas of a multi-area IGP routing domain or an ASBR of an autonomous system that communicates with ASBRs of other autonomous systems using an exterior gateway protocol to exchange routing information. Interior TE link 134 couples border router 130A and border router 130B. IGP area 122A further includes interior routers 124A, 124B and source router 126 connected in a topology with border routers 130. IGP area 122B further includes interior routers 132A, 132B and destination router 128 connected in a topology with border routers 130.

LSP 138 represents a traffic engineered label switched path (TE LSP) from source router 126 of IGP area 122A to destination router 128 of IGP area 122B. Source router 126 may establish LSP 138 by computing a constrained shortest path first (CSPF) path from source router 126 to border router 130A and relying on border router 130A to route an RSVP message, for example, using shortest path first toward destination router 128 to complete LSP establishment. Using TED NRLI techniques described herein, interior router 124A acquires topological visibility of interior TE link 134 and therefore may use interior TE link 134 for link protection bypass for LSP 138.

Border router 130A executes an IGP with traffic engineering extensions to receive TE information for interior TE link 134. Border router 130A encodes a TED NLRI for interior TE link 134 using above-described techniques and sends the TED NLRI for advertisement with an attribute of BGP UPDATE message 136 to router 124A. Router 124A decodes the TED NLRI and installs the TE information for interior TE link 134 to a TED.

Router 124A, having visibility of interior TE link 134, protects the section of LSP 138 connecting router 124A (operating as an FRR point of local repair) to border router 130A (operating as an FRR merge point) with a traffic engineered FRR LSP 140 that includes interior TE link 134. TE link 134 thus makes up a subpath of FRR LSP 140. As a result, despite lacking topological visibility into IGP area 122B, router 124A may set up a link protection bypass for LSP 138 for the router 124A to border router 130A link.

Figure 8:
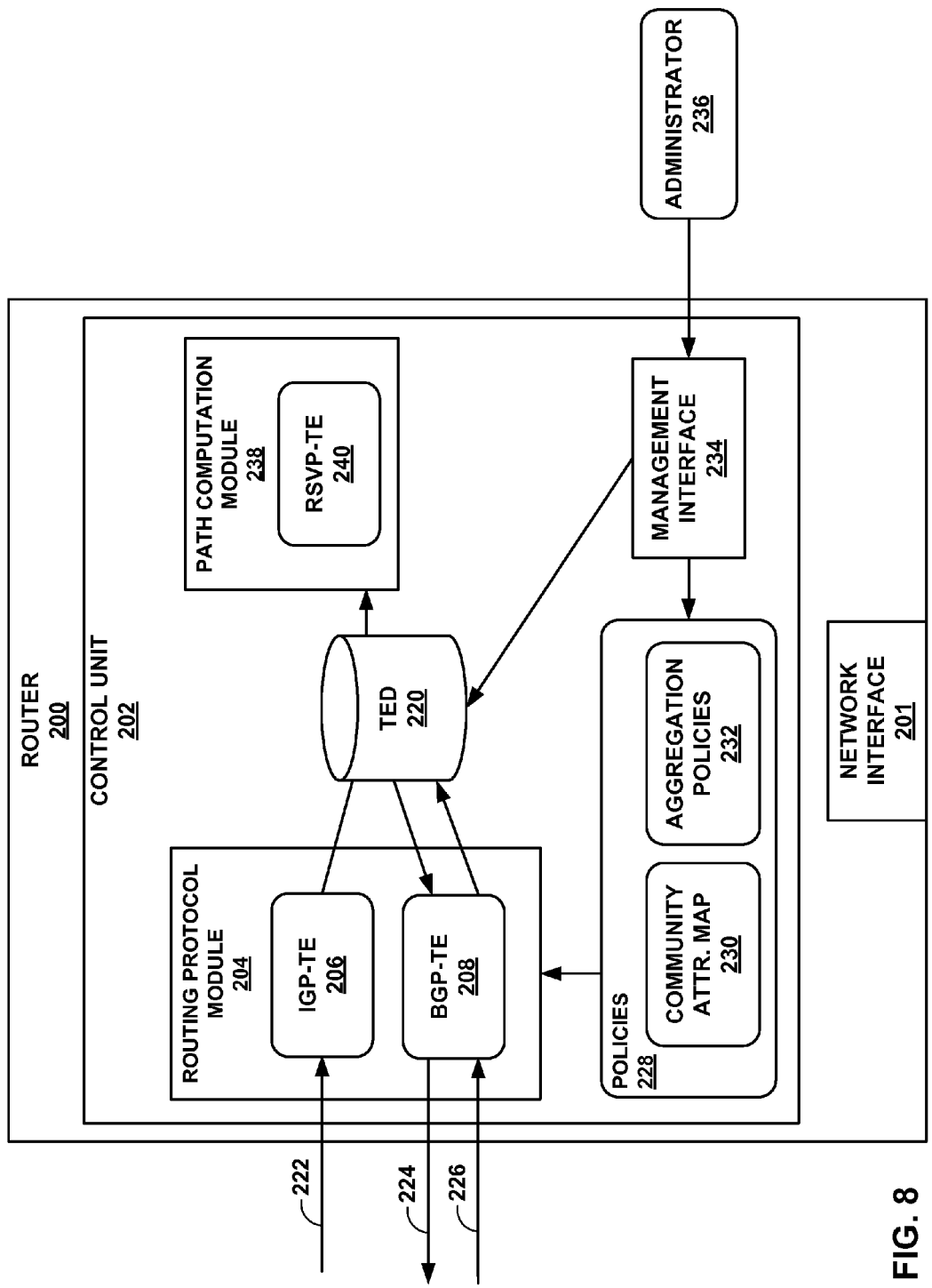
FIG. 8 is a block diagram illustrating a detailed example router that originates and receives BGP UPDATE messages that include an attribute that specifies TED NLRI in conformity to techniques described in this disclosure.

FIG. 8 is a block diagram illustrating an example router that originates and receives BGP UPDATE messages that include an attribute that specifies TED NLRI in conformity to techniques described in this disclosure. Router 200 may represent an example instance of the routers described above that perform TED NLRI encoding and decoding to advertise traffic engineering information with BGP. For example, router 200 may represent an example instance of border router 6.

Control unit 202 of router 200 provides an operating environment for executing routing protocol module 204, a routing protocol software process that implements interior and exterior routing protocols to exchange routing and other traffic engineering information with other network devices. In some instances, responsibility for executing various routing protocols may allocated among respective processes. Control unit 202 may include one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein.

Routing protocol module 204 executes Interior Gateway Protocol with Traffic Engineering extensions (IGP-TE) 206 to perform IGP peering, if necessary, and receive link state information in TE link advertisements 222 issued by other routers for one or more traffic engineering (TE) links in an IGP routing area in which router 200 is logically located. IGP-TE 206 may represent OSPF-TE or IS-IS-TE, for instance. TE link advertisements 222 may represent OSPF-TE Link State Advertisements or IS-IS-TE Link State Protocol Data Units. Routing protocol module 204 stores a representation of the received link state information, including traffic engineering information received for the TE links, to Traffic Engineering Database (TED) 220, a protocol-neutral database of TE links. Traffic engineering links stored to TED 220 may include physical IGP links (i.e., network links) as well as virtual links such as LSPs or GRE tunnels. Traffic engineering information for the TE links stored to TED 220 includes link attributes such as local/remote IP addresses or router identifiers, local/remote interface indices, metric type and/or value, link bandwidth, reservable bandwidth, per CoS class reservation state, preemption value, and Shared Risk Link Group. Router 200 may in some instances include a separate link state database used IGP-TE 206 to store link state for IGP links in the routing area.

Routing protocol module 204 also executes Border Gateway Protocol with Traffic Engineering extensions (BGP-TE) 208 to peer with BGP speakers and BGP listeners to exchange routing information, including TED NLRI in accordance with techniques described herein. That is, routing protocol module 204 executes BGP-TE 208 to advertise TE links stored to TED 220 using TED NLRI in attributes (e.g., MP_REACH_NLRI) of BGP UPDATE messages 224 to replicate at least a portion of TED 220 across IGP area boundaries. In some instances, routing protocol module 204 further executes BGP-TE 208 to receive advertised TE links in BGP UPDATE messages 226 issued by BGP peers that incorporate the TED NLRI capability described herein. Routing protocol module 204 decodes TED NLRI and stores TE information for the TE links advertises therein to TED 220. Routing protocol module 204 and BGP peers may perform a capability exchange (e.g., mutual advertisement) as part of the peering process to determine respective TED NLRI capabilities.

An administrator 236 (or a network management entity) invokes management interface 234 of control unit 202 to configure policies 228 of control unit 202. Management interface 234 may, for instance, represent a command line interface, graphical user interface, or Simple Network Management Protocol (SNMP) interface. Policies 228 includes a set of rule-based actions and/or configuration data, in particular community attribute map 230 and aggregation policies 232, that determine processing of received TED NLRI and processing of TED NLRI advertisements by routing protocol module 204.

In some examples, policies 228 include a rate configuration attribute that defines a maximum rate of TED NLRI updates. Because network traffic engineering state is highly dynamic, the rate configuration attribute enables administrator 236 to throttle TED NLRI-incorporating BGP UPDATE messages to reduce the amount of signaling information in the network signaling plane. In some example, the rate configuration attribute defines a minimum interval between BGP UPDATE messages that include TED NLRI.

Community attribute map 230 (illustrated as "community attr. map 230") is an associative data structure, such as a table, list, or map, that maps community attribute values to IGP area information. Community attribute map 230 stores Community and/or Extended Community path attributes ("community path attributes") for use with policies 228. In general, a community path attribute identifies a prefix reachable using an advertised route as having some quality in common with other prefixes in a network. Including community path attributes with advertised routes enables BGP peers to group prefixes and enact routing policies specific to the group of prefixes. A community path attribute value is typically a 32-bit integer or an autonomous system number combined with a 32-bit integer. The BGP community attribute is described in further detail in R. Chandra et al., RFC 1997, "BGP Communities Attribute," Network Working Group, the Internet Engineering Task Force, August, 1996, the entire content of which is incorporated by reference herein. Additional information regarding the BGP extended community attribute is found in Sangli et al., RFC 4360, "BGP Extended Communities Attribute," Network Working Group, the Internet Engineering Task Force, February, 2006, the entire content of which is incorporated by reference herein. Administrator 236 or a network management agent may add, modify, and delete community path attributes of community attribute map 230 using management interface 234 to map IGP areas of a network and corresponding information to BGP communities.

Policies 228 may indicate a preference with respect to routing protocol module 204 to prefer TED NLRI carried in BGP UPDATE messages that have shorter AS_PATH lengths. In addition, policies 228 may indicate a preference for TE links advertised using IGP-TE 206. In other words, policies 228 may give TE attributes for a link received by executing IGP-TE 206 a higher priority for TED 220 installation than TE attributes for a link received in one of BGP UPDATE messages 226. Management interface 234 may additionally provide administrator 236 with an interface with which to configure static TE links with TE information in TED 220, such as inter-AS TE links.

Aggregation policies 232 allow administrator 236 to define varying levels of topology exposure for IGP areas served by router 200. For example, aggregation policies 232 may specify, for instance, full exposure of an IGP area topology as described above with respect to FIG. 4, limited exposure as described above with respect to FIG. 5, or still further limited exposure as described above with respect to FIG. 6.

In some instances, router 200 includes path computation module 238 that computes traffic engineering paths (e.g., paths for TE LSPs) by executing a constrained shortest path first (CSPF) algorithm over TED 220 based on traffic engineering input constraints (e.g., available bandwidth). Path computation module 238 may then pass the traffic engineered paths to a path setup protocol such as RSVP-TE module 240 that reserves resources along respective computed paths to establish, e.g., TE LSPs.

Figure 9:
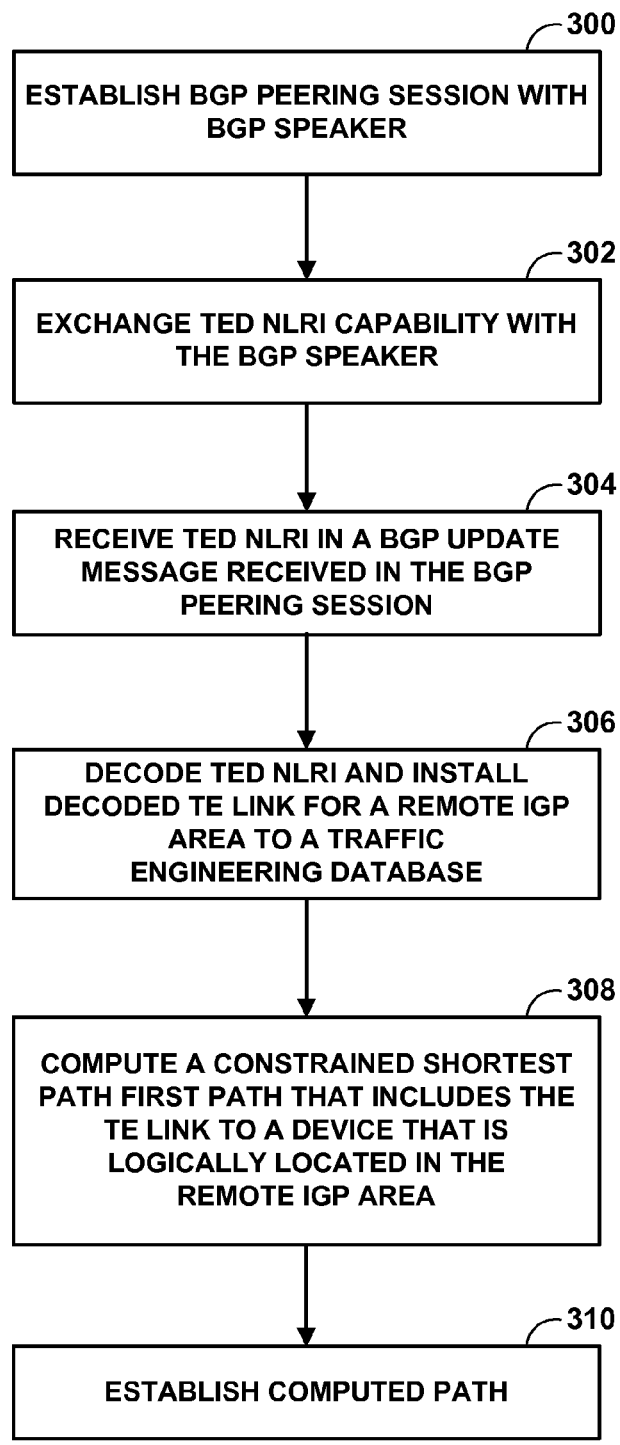
FIG. 9 is a flowchart illustrating an example mode of operation of a network device that, consistent with techniques described herein, receives TED NLRI and computes a path for a TE LSP based on TE information in the TED NLRI for a TE link in a remote IGP area.

FIG. 9 is a flowchart illustrating an example mode of operation of a network device that, consistent with techniques described herein, receives TED NLRI and computes a path for a TE LSP based on TE information in the TED NLRI for a TE link in a remote IGP area. While described with respect to router 200 of FIG. 8, the techniques may applicable to other network devices, such as network device 8 of FIG. 1.

Routing protocol module 204 executes BGP-TE 208 to establish a BGP peering session with a BGP speaker that serves a remote IGP area (300). Routing protocol module 204 may be unable to perform IGP peering with the BGP speaker and/or other routers of the remote IGP area. As part of establishing the BGP peering session, routing protocol module 204 and the BGP speaker may exchange a TED NLRI capability value to indicate to one another a mutual ability to originate and/or receive TED NLRI in BGP UPDATE messages (302).

Routing protocol module 204 receives, from the BGP speaker in the BGP peering session, a BGP UPDATE message that includes a TED NLRI (304). Routing protocol module 204 decodes the TED NLRI to identify TE information including node anchors, link attributes, and link descriptors of the encoded TE link, and routing protocol module 204 installs the TE link information to traffic engineering database 220 (306). Subsequently, path computation module 238 executes a CSPF algorithm over TED 220 to compute a satisfactory path that meets one or more traffic engineering constraints (308). Path computation module 238 then establishes the computed path using a path setup protocol (310).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

What is claimed is:

1. A method comprising:
   receiving, with a network device from an area border router logically located within a second routing protocol domain, a routing protocol advertisement for an exterior gateway routing protocol;
   decoding traffic engineering information for a traffic engineering link from the routing protocol advertisement, wherein the decoded traffic engineering information includes at least one router identifier for an anchor node of the traffic engineering link;
   determining, by the network device, a first traffic engineered path for a label-switched path (LSP) from a source router logically located within the first routing protocol domain to a destination router logically located within the second routing protocol domain;
   determining, by the network device, a second traffic engineered path for a bypass LSP for the LSP by selecting, in response to determining that at least one router identifier for the anchor node of the traffic engineering link is an area border router for the first routing protocol domain, the traffic engineering link for inclusion in the second traffic engineered path based on the decoded traffic engineering information; and
   establishing, by the network device, the LSP along the first traffic engineered path and the bypass LSP along the second traffic engineered path.

2. The method of claim 1, wherein the first traffic engineering path for the LSP and the second traffic engineering path for the bypass LSP traverse different sub-paths within the second routing protocol domain.

3. The method of claim 1, wherein the first traffic engineering path for the LSP does not include the traffic engineering link.

4. The method of claim 1, wherein selecting the traffic engineering link for inclusion in the second traffic engineered path based on the decoded traffic engineering information comprises:
   selecting, by the network device in response to determining the decoded traffic engineering information indicates the traffic engineering link is not a sub-path of the first traffic engineering path, the traffic engineering link for inclusion in the second traffic engineered path.

5. The method of claim 1, wherein selecting the traffic engineering link for inclusion in the second traffic engineered path based on the decoded traffic engineering information comprises:
   selecting, by the network device in response to determining the decoded traffic engineering information indicates the area border router is an endpoint of the traffic engineering link, the traffic engineering link for inclusion in the second traffic engineered path.

6. The method of claim 1,
   wherein the network device comprises a path computation element, and
   wherein establishing the LSP along the first traffic engineered path and the bypass LSP along the second traffic engineered path comprises sending, by the network device, first data defining the LSP to a source router of the LSP and second data defining the bypass LSP to a point of local repair router of the LSP.

7. The method of claim 1, wherein the network device comprises the source router logically located within the first routing protocol domain.

8. The method of claim 1,
   wherein the area border router comprises a first area border router that is a next hop from the first routing protocol domain to the second routing protocol domain according to the exterior gateway routing protocol, and
   wherein the traffic engineering information indicates the traffic engineering link couples the first area border router to a second area border router of the second routing protocol domain, wherein the second area border router is a next hop from the first routing protocol domain to the second routing protocol domain according to the exterior gateway routing protocol.

9. A network device comprising:
   a memory;
   one or more processors operably coupled to the memory, wherein the memory stores instructions that configure the one or more processors to:
   receive, from an area border router logically located within a second routing protocol domain, a routing protocol advertisement for an exterior gateway routing protocol;
   decode traffic engineering information for a traffic engineering link from the routing protocol advertisement, wherein the decoded traffic engineering information includes at least one router identifier for an anchor node of the traffic engineering link;
   determine a first traffic engineered path for a label-switched path (LSP) from a source router logically located within a first routing protocol domain to a destination router logically located within the second routing protocol domain;

determine a second traffic engineered path for a bypass LSP for the LSP by selecting, in response to determining the at least one router identifier for the anchor node of the traffic engineering link is an area border router for the first routing protocol domain, the traffic engineering link for inclusion in the second traffic engineered path based on the decoded traffic engineering information; and establish the LSP along the first traffic engineered path and the bypass LSP along the second traffic engineered path.

10. The network device of claim 9, wherein the first traffic engineering path for the LSP and the second traffic engineering path for the bypass LSP traverse different sub-paths within the second routing protocol domain.

11. The network device of claim 9, wherein the first traffic engineering path for the LSP does not include the traffic engineering link.

12. The network device of claim 9, wherein to select the traffic engineering link for inclusion in the second traffic engineered path based on the decoded traffic engineering information the instructions configure the one or more processors to select, in response to determining the decoded traffic engineering information indicates the traffic engineering link is not a sub-path of the first traffic engineering path, the traffic engineering link for inclusion in the second traffic engineered path.

13. The network device of claim 9, wherein to select the traffic engineering link for inclusion in the second traffic engineered path based on the decoded traffic engineering information the instructions configure the one or more processors to select, in response to determining the decoded traffic engineering information indicates the area border router is an endpoint of the traffic engineering link, the traffic engineering link for inclusion in the second traffic engineered path.

14. The network device of claim 9,
wherein the network device comprises a path computation element, and
wherein to establish the LSP along the first traffic engineered path and the bypass LSP along the second traffic engineered path the instructions configure the one or more processors to send first data defining the LSP to a source router of the LSP and second data defining the bypass LSP to a point of local repair router of the LSP.

15. The network device of claim 9, wherein the network device comprises the source router logically located within the first routing protocol domain.

16. The network device of claim 9,
wherein the area border router comprises a first area border router that is a next hop from the first routing protocol domain to the second routing protocol domain according to the exterior gateway routing protocol, and
wherein the traffic engineering information indicates the traffic engineering link couples the first area border router to a second area border router of the second routing protocol domain, wherein the second area border router is a next hop from the first routing protocol domain to the second routing protocol domain according to the exterior gateway routing protocol.

17. A non-transitory computer readable medium comprising instructions for causing one or more processors of a network device to:
receive, from an area border router logically located within a second routing protocol domain, a routing protocol advertisement for an exterior gateway routing protocol;
decode traffic engineering information for a traffic engineering link from the routing protocol advertisement, wherein the decoded traffic engineering information includes at least one router identifier for an anchor node of the traffic engineering link;
determine a first traffic engineered path for a label-switched path (LSP) from a source router logically located within the first routing protocol domain to a destination router logically located within the second routing protocol domain;
determine a second traffic engineered path for a bypass LSP for the LSP by selecting, in response to determining the at least one router identifier for the anchor node of the traffic engineering link is an area border router for the first routing protocol domain, the traffic engineering link for inclusion in the second traffic engineered path based on the decoded traffic engineering information; and
establish the LSP along the first traffic engineered path and the bypass LSP along the second traffic engineered path.

18. The non-transitory computer readable medium of claim 17, wherein the network device comprises one of the source router and a path computation element for the source router.

19. A method comprising:
receiving, with a network device from an area border router logically located within a second routing protocol domain, a routing protocol advertisement for an interior gateway protocol;
decoding traffic engineering information for a traffic engineering link from the routing protocol advertisement;
determining, by the network device, a first traffic engineered path for a label-switched path (LSP) from a source router logically located within a first routing protocol domain to a destination router logically located within the second routing protocol domain, wherein the area border router comprises a first area border router that is a next hop from the first routing protocol domain to the second routing protocol domain according to the interior gateway protocol;
wherein the traffic engineering information indicates the traffic engineering link couples the first area border router to a second area border router of the second routing protocol domain, and
wherein the second area border router is a next hop from the first routing protocol domain to the second routing protocol domain according to the interior gateway protocol;
determining, by the network device, a second traffic engineered path for a bypass LSP for the LSP by selecting the traffic engineering link for inclusion in the second traffic engineered path based on the decoded traffic engineering information; and
establishing, by the network device, the LSP along the first traffic engineered path and the bypass LSP along the second traffic engineered path.

* * * * *

UNITED STATES PATENT AND TRADEMARK OFFICE
CERTIFICATE OF CORRECTION

PATENT NO. : 9,667,550 B2
APPLICATION NO. : 14/697415
DATED : May 30, 2017
INVENTOR(S) : Hannes Gredler, Jan Medved and David Ward It is certified that error appears in the above-identified patent and that said Letters Patent is hereby corrected as shown below:

In the Claims

Column 17, Line 54 (Claim 1): Replace "located within the first routing" with --located within a first routing--

Column 20, Line 15 (Claim 17): Replace "located within the first routing" with --located within a first routing--

Signed and Sealed this
Twenty-fourth Day of July, 2018

Andrei Iancu
*Director of the United States Patent and Trademark Office*